United States Patent [19]

Yasuda et al.

[11] Patent Number: 5,667,099

[45] Date of Patent: Sep. 16, 1997

[54] METHOD AND APPARATUS FOR POWDER DISTRIBUTION

[75] Inventors: Shinichiro Yasuda, Osaka; Keisaku Inoue, Wakayama, both of Japan

[73] Assignee: Kao Corporation, Tokyo, Japan

[21] Appl. No.: 462,887

[22] Filed: Jun. 5, 1995

[30] Foreign Application Priority Data

Jun. 24, 1994 [JP] Japan .................................. 6-166376

[51] Int. Cl.⁶ .................................................. B65D 88/54
[52] U.S. Cl. ............................ 222/1; 222/330; 222/410
[58] Field of Search ........................ 222/1, 185.1, 330, 222/226, 410

[56] References Cited

U.S. PATENT DOCUMENTS

| | | | |
|---|---|---|---|
| 204,454 | 6/1878 | Russell | 222/330 X |
| 920,597 | 5/1909 | Mallett | 222/330 |
| 1,348,885 | 8/1920 | Laffoon | 222/330 |
| 1,702,341 | 2/1929 | Gillespie | 222/330 X |
| 2,189,018 | 2/1940 | Robinson | 222/330 X |
| 2,601,534 | 6/1952 | Laffoon | 222/330 |
| 3,512,680 | 5/1970 | Krolopp | 222/330 X |
| 3,652,131 | 3/1972 | Carlsson | 222/330 X |
| 3,904,335 | 9/1975 | Watkins | 222/330 X |
| 3,995,668 | 12/1976 | Goodman | 222/330 X |
| 4,418,771 | 12/1983 | Henry et al. | 222/330 X |
| 4,767,322 | 8/1988 | Beckenbach et al. | 222/330 X |
| 5,305,912 | 4/1994 | Johnston | 222/330 X |

FOREIGN PATENT DOCUMENTS

52-60795  5/1977  Japan .
2258501 10/1990  Japan .

*Primary Examiner*—Kevin P. Shaver

[57] ABSTRACT

Previously weighed powder is radially scattered by centrifugal force. The scattered powder is introduced into a plurality of powder chambers via a plurality of powder inlets arranged along the circumferential direction. The powder, dispersed almost uniformly with respect to the circumferential direction, is distributed at a given ratio corresponding to the ratio of the areas of the powder inlets. The powder is accurately and efficiently distributed into plural portions of a given weight each without melting, aggregating or crushing.

2 Claims, 5 Drawing Sheets

METHOD AND APPARATUS FOR POWDER DISTRIBUTION

FIELD OF THE INVENTION

The present invention relates to a method and apparatus for powder distribution. The present invention can be used to distribute a given amount of powder to a plurality of recipients, such as containers, in a process for producing a food, a pharmaceutical, a chemical product, an electrophotographic toner, or the like.

DESCRIPTION OF RELATED ART

Traditionally, methods for supplying a given amount of powder to a plurality of recipients are roughly divided into two types: methods based on measuring powder volume and those based on measuring powder weight.

One conventional powder supplying apparatus based on volume measurement measures a given volume of powder by sucking the powder into a cylinder of a given capacity, and force feeding the powder to a powder recipient from the cylinder. Another conventional powder supplying apparatus based on volume measurement includes a chute, and a screw which can be rotated in the chute, whereby a given volume of powder is supplied to a powder recipient from the chute filled by powder according to the number of revolution of the screw. However, since the bulk density of powder changes with the passing of time, powder supply based on volume measurement involves a problem of great difference between the actual supply weight and the desired weight.

To solve this problem, an apparatus was proposed in which a given volume of powder is measured by filling the powder in a filling space of a given volume, from which the powder is force fed to a powder recipient, and if the powder's bulk density changes thereafter, the difference between the actual supply weight and the desired weight is corrected by adjusting the volume of the filling space (see Japanese Unexamined Patent Publication SHO No. 52-60795). However, such correction must be done during powder supply, so that painstaking operation is necessary if manual correction is applied, and a complex control system is necessary if automatic correction is applied.

In the case of distributing powder such as electrophotographic toner, the above problem is severe due to high fluidity and great variation of bulk density, because each particle of the toner is very small, i.e., the particle diameter is generally about 10 μm, and because the toner is supplemented with a fluidity-improving agent.

As a powder supplying apparatuses based on weight measurement, an apparatus was proposed in which a given amount of powder is supplied to a powder recipient according to the number of revolution of an auger, and the number of revolution of the auger is feedback-controlled on the basis of difference between the actual weight of the supplied powder measured by an electronic balance and the desired weight, to supply a given weight of powder to the powder recipient (see Japanese Unexamined Patent Publication HEI No. 2-258501). In the powder supply based on weight measurement, a given weight of powder can be supplied with high precision, because there is no influence of change of the bulk density of the powder. However, much time is taken for each measurement. In particular, when a large amount of powder is supplied little by little to a large number of powder recipients, there is a problem that productivity is remarkably lower in comparison with powder supply based on volume measurement.

When a given amount of powder is supplied by rotating a screw, an auger, or the like as described above, by taking into consideration the fact that the powder's bulk density increases with the passing of time, the rotation rate is high at first and gradually decreased. However, each particle of powder such as electrophotographic toner includes thermoplastic resin, so that the powder is molten by heat produced by friction with the screw, auger, or the like. There are some problems based on the melting, i.e., the powder adheres to the auger, screw, or the like, thus interfering with powder supply, and the powder aggregates in a molten state, thus degrading product value and being crushed under compressive force.

The object of the present invention is to provide a method and apparatus for distributing powder in plural portions of a given weight each with decreased error and good productivity, without melting, aggregating and crushing, to solve the above-described problems in the prior art.

SUMMARY OF THE INVENTION

The powder distribution method of the present invention comprises the step of radially scattering previously weighed powder by centrifugal force, and introducing the scattered powder into a plurality of powder chambers via a plurality of powder inlets arranged along the circumferential direction. According to the distribution method of the present invention, the scattered powder can be dispersed almost uniformly with respect to the circumferential direction by radially scattering the powder by centrifugal force. By introducing the almost uniformly dispersed powder into the plurality of powder chambers via the plurality of powder inlets arranged along the circumferential direction, the powder can be distributed at an almost constant volume ratio corresponding to the ratio of the areas of the powder inlets. The powder is previously weighed before the distribution, and the ratio of the weights of the portions of the powder distributed at almost constant volume ratio is almost constant, so that even if the powder's bulk density changes during the distribution, the weight of each portion of the powder introduced into each powder chamber does not change. Accordingly, powder of the desired weight can be introduced into each powder chamber without increasing error, without influence of change of the powder's bulk density, and without painstaking operation or complex control system. Additionally, in comparison with weighing each portion of the powder introduced into each powder chamber, powder-weighing time can be shortened in proportion to the number of the powder portions. Moreover, even if each particle of the powder such as electrophotographic toner comprises thermoplastic resin, the powder does not melt, aggregate and crush, because the powder does not suffer significant heat and compressive force during distribution.

In the powder distribution method of the present invention, it is preferable that the powder whose weight is obtained by multiplying a preset weight by an integer of 2 or more is weighed out, that the centrifugal force for scattering the weighed powder is exerted by a rotary element rotating around the rotation axis along the vertical direction, that the plurality of powder inlets are arranged around the rotation axis of the rotary element, that the dimensions of the powder inlets along the circumferential direction are mutually equalized on any circle centering on the rotation axis of the rotary element, and that the total number of the powder inlets is equalized to the above-mentioned integer. By arranging the plurality of powder inlets around the rotation axis of the rotary element and mutually equalizing the dimensions of the powder inlets along the circumferential direction on any circle centering on the rotation axis of the rotary element, the areas of the powder inlets are mutually equalized. In addition, by centrifugally radially scattering the powder whose weight is obtained by multiplying a preset weight by an integer of 2 or more and introducing the scattered powder into the same number of powder chambers as the above-mentioned integer, the weight of each distributed portion of the powder can be almost equalized to the preset weight. By exerting a centrifugal force for scattering the weighed powder by a rotary element rotating around the rotation axis along the vertical direction, the powder can be prevented from being unevenly scattered due to the influence of gravity. With these features, it is possible to improve the distribution uniformity of the centrifugally radially scattered powder with respect to the circumferential direction, to reduce the difference between the actual weight of each distributed portion of the powder and the desired weight, whereby the amounts of the portions of the powder introduced into the powder chambers are mutually equalized.

In the powder distribution method of the present invention, it is preferable that the angle of repose of the powder is not more than 45 degrees. Since any powder having an angle of repose of not more than 45 degrees can be smoothly scattered by centrifugal force, because it has good fluidity, distribution uniformity with respect to the circumferential direction can be improved when the powder is centrifugally radially scattered. Therefore, the difference between the actual weight of each distributed portion of the powder and the desired weight can be reduced.

The powder distribution apparatus of the present invention comprises a housing, means for radially scattering powder in the housing by centrifugal force, and a plurality of powder inlets arranged along the circumferential direction for introducing the scattered powder into the plurality of powder chambers. According to the distribution apparatus of the present invention, the distribution method of the present invention can be embodied.

It is preferable that the means for centrifugally radially scattering the powder have a rotary element rotatable around a rotation axis along the vertical direction in the housing, that the rotary element has a powder receiving face, that the plurality of powder inlets are arranged around the rotation axis of the rotary element, and that the powder supplied to the powder receiving face can be radially scattered from the peripheral portion of the powder receiving face by the action of the centrifugal force produced by rotation of the rotary element. By the structure that the rotation axis of the rotary element runs along the vertical direction, the powder is prevented from being unevenly scattered due to the influence of gravity.

Figure 3:
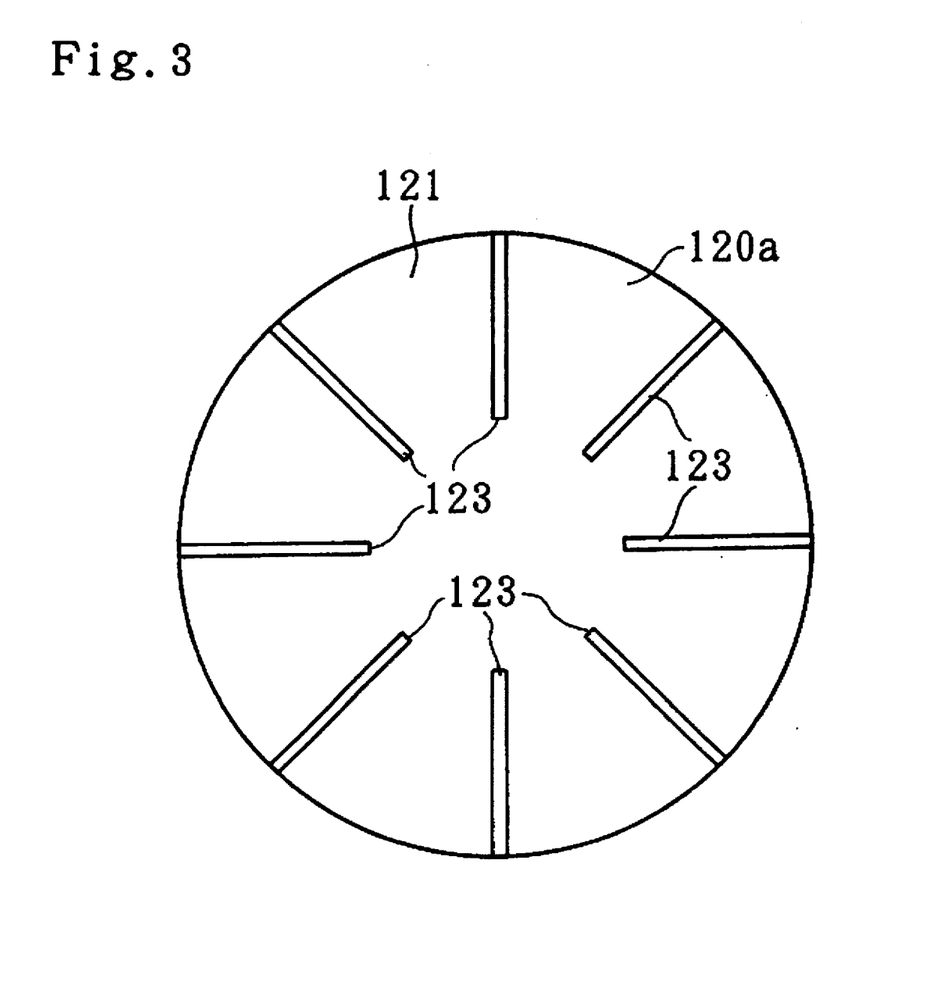

It is preferable that the position of the peripheral portion of the powder receiving face of the rotary element is higher than that of the central portion thereof. Because this positioning reduces the influence of gravity upon the powder scattered from the peripheral portion of the powder receiving face by the centrifugal force, it is possible to improve powder distribution uniformity with respect to the circumferential direction and reduce the difference between the actual weight of each distributed portion of the powder and the desired weight, without significantly increasing the rotation rate of the rotary element.

It is preferable that the peripheral portion of the powder receiving face is divided by a plurality of radially arranged partitions, whereby powder distribution uniformity with respect to the circumferential direction on the peripheral portion of the powder receiving face can be improved. In other words, powder distribution uniformity with respect to the circumferential direction can be improved before the powder is scattered from the peripheral portion of the powder receiving face, so that the difference between the actual weight of each distributed portion of powder and the desired weight can be reduced.

It is preferable that on any circle centering on the rotation axis of the rotary element, the dimensions of the powder inlets along the circumferential direction are mutually equal, whereby the areas of the powder inlets are mutually equalized, so that the amounts of the portions of the powder introduced into the powder chambers via the respective powder inlets are mutually equalized.

BRIEF DESCRIPTION OF THE DRAWINGS

FIG. 1 is a longitudinal cross-sectional view of the powder distribution apparatus of an embodiment of the present invention.

FIG. 2 is a cross-sectional view of the powder distribution apparatus (cross-sectional view of FIG. 1 taken along the II—II line.

FIG. 3 is a plan view of the rotary element of the powder distribution apparatus.

FIG. 4A is a plan-sectional view of elements constituting powder chambers of the powder distribution apparatus. FIG. 4B is a cross-sectional view along the circumferential direction of the portion of the element constituting the powder chambers of the powder distribution apparatus.

FIG. 5A is a sectional view of a first modification of the rotary element of the powder distribution apparatus. FIG. 5B is a sectional view of a second modification of the rotary element of the powder distribution apparatus. FIG. 5C is a sectional view of a third modification of the rotary element of the powder distribution apparatus.

DETAILED DESCRIPTION OF PREFERRED EMBODIMENTS

The powder distribution apparatus 101 illustrated in FIG. 1 is used to distribute powder 4 into plural portions of a given weight each and supply each portion of the powder 4 to each of a plurality of powder containers 3 mounted on a turntable 102. The turntable 102 has a rotary plate 104 attached onto a base 103 rotatably around a rotation axis along the vertical direction, and a ring-shaped table body 106 connected to the rotary plate 104 via rods 105.

A support frame 107 is arranged above the powder containers 3 mounted on the table body 106. A housing is fixed on the support frame 107. The housing 108 has a cylindrical peripheral wall 109, a bottom wall 110 connected to the bottom of the peripheral wall 109, and an upper wall connected to the top of the peripheral wall 109. Into an opening 111*a* formed at the center of the upper wall 111, a hopper 112 is inserted. The hopper 112 is supported by the upper face of the upper wall 111 via a load cell 12. Above the hopper 112, a chute 10 for charging the powder 4 from a powder supply source (not illustrated) to the hopper 112 is arranged. The lower opening 112*a* of the hopper 112 is opened and closed by a valve 115. From the upper portion of the valve 115, a valve rod 115*a* extends. The solid line in the figure shows a condition in which the lower opening 112*a* of the hopper 112 is closed by the valve 115. By upwardly shifting the valve 115 via the valve rod 115*a* as shown in the two-dot chain line in the figure, the lower opening 112*a* of the hopper 112 is opened. The valve 115 may be moved up and down manually by an operator or automatically by a driving mechanism. The load cell 12 is connected to a weight indicator 116.

In the upper space within the housing 108, a rotary element 120 is provided. The rotary element 120 is rotatable around a rotation axis along the vertical direction coinciding with the central axis of the cylindrical peripheral wall 109 of the housing 108. The rotary element 120 has a body 121 having a circular plan as shown in FIG. 3, and a columnar joint block 122 attached to the bottom of the body 121. An upper end of a rotation shaft 124 is screwed into the joint block 122, and an lower end of the rotation shaft 124 is connected to the output shaft of a motor 125. The a rotation shaft 124 is supported rotatably around the rotation axis along the vertical direction by the inner periphery of a cylindrical support column 126 via bearings 127 and 128. The support column 126, which passes through the support frame 107 and the bottom wall of the housing 108 attached to the bottom wall 110 via a flange 126a. To the upper and lower ends of the support column 126, ring-shaped cover plates 129 and 130 are attached. Between the upper cover plate 129 and the rotation shaft 124, a sealing element 131 for preventing the leak of the powder 4 from the housing 108 is arranged. The motor 125 attached to the support frame 107 by bolts 132 is driven via a rotation rate control unit (not illustrated).

The upper face of the body 121 of the rotary element 120 constitutes a powder receiving face 120a. The central portion of the powder receiving face 120a is arranged below the lower opening 112a of the above-described hopper 112. The powder receiving face 120a is parabolic so that the position of the peripheral portion thereof is higher than that of the central portion thereof. As illustrated in FIG. 3, the peripheral portion of the powder receiving face 120a is divided by a plurality of radially arranged partitions 123. These partitions 123 are arranged along the radial direction of a circle centering on the rotation axis of the rotary element 120 and at equal intervals in the circumferential direction.

Figure 1:
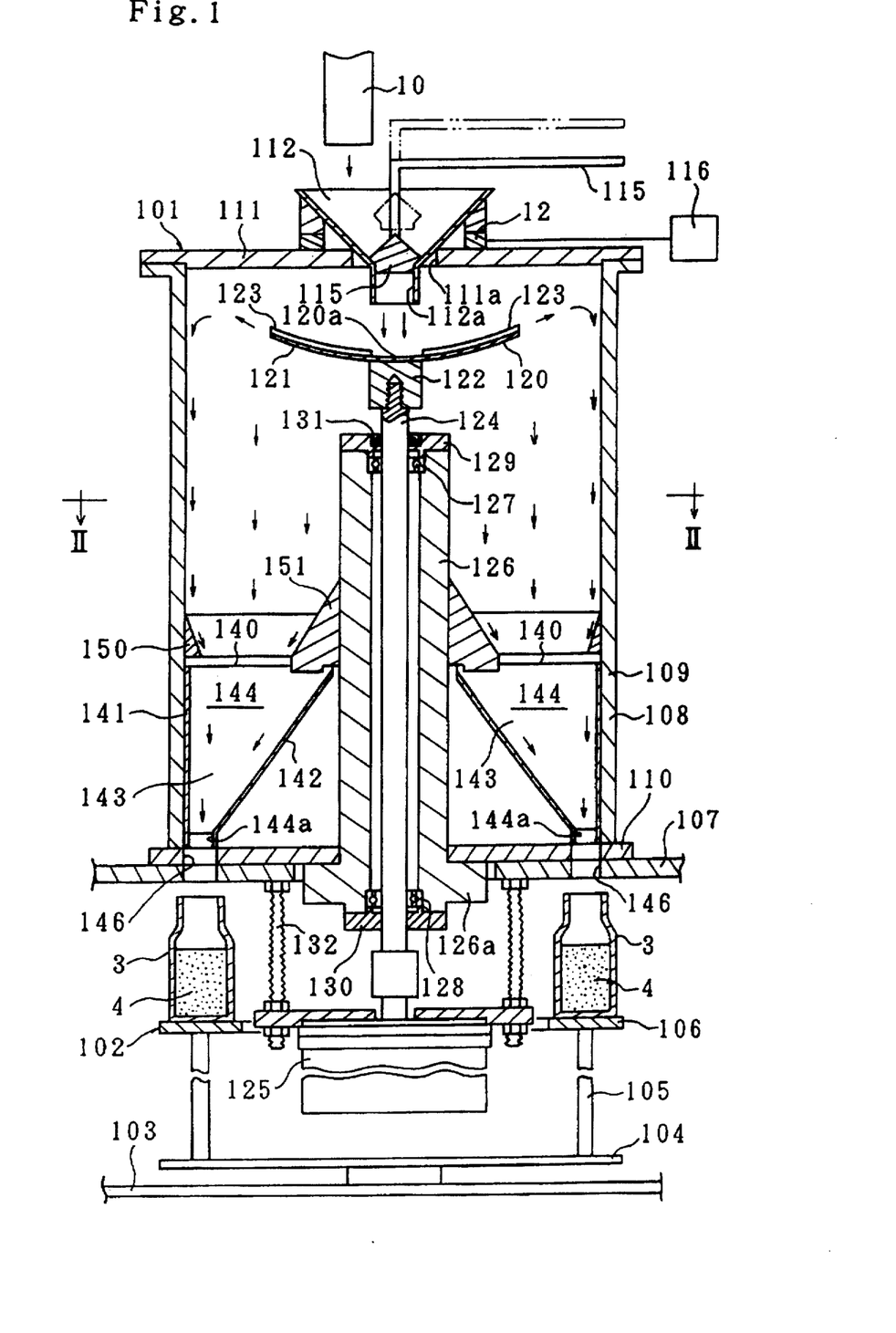
Figure 2:
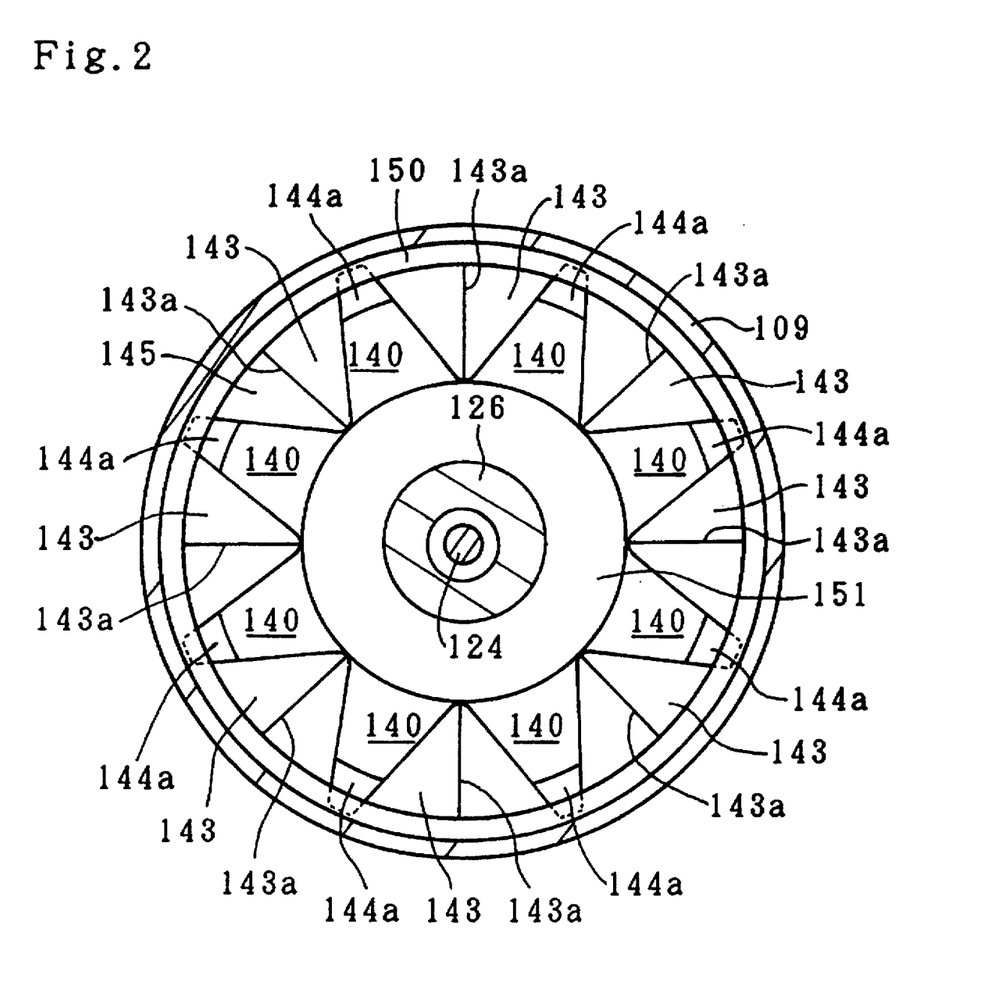

As illustrated in FIGS. 1 and 2, in the lower space within the housing 108, 8 powder inlets 140 and 8 powder chambers 144 are provided. These powder inlets 140 and powder chambers 144 are arranged along the circumferential direction around the rotation axis of the rotary element 120. To be more precise, an outer peripheral wall 141 along the cylinder face and an inner peripheral wall 142 along the cone face are inserted into the housing 108. The space between the inner peripheral face of the outer peripheral wall 141 and the outer peripheral face of the inner peripheral wall 142 is divided by 8 partitions 143, so that the powder chambers 144 are constituted. The upper opening of each powder chamber 144 constitutes each powder inlet 140. The upper edges 143a of the partitions 143 are arranged along the radial direction of a circle centering on the rotation axis of the rotary element 120 and are arranged at equal intervals in the circumferential direction. On any circle centering on the rotation axis of the rotary element 120, the dimensions of the powder inlets 140 along the circumferential direction are mutually equalized, whereby the areas of the powder inlets 140 are mutually equalized.

Figure 4A:
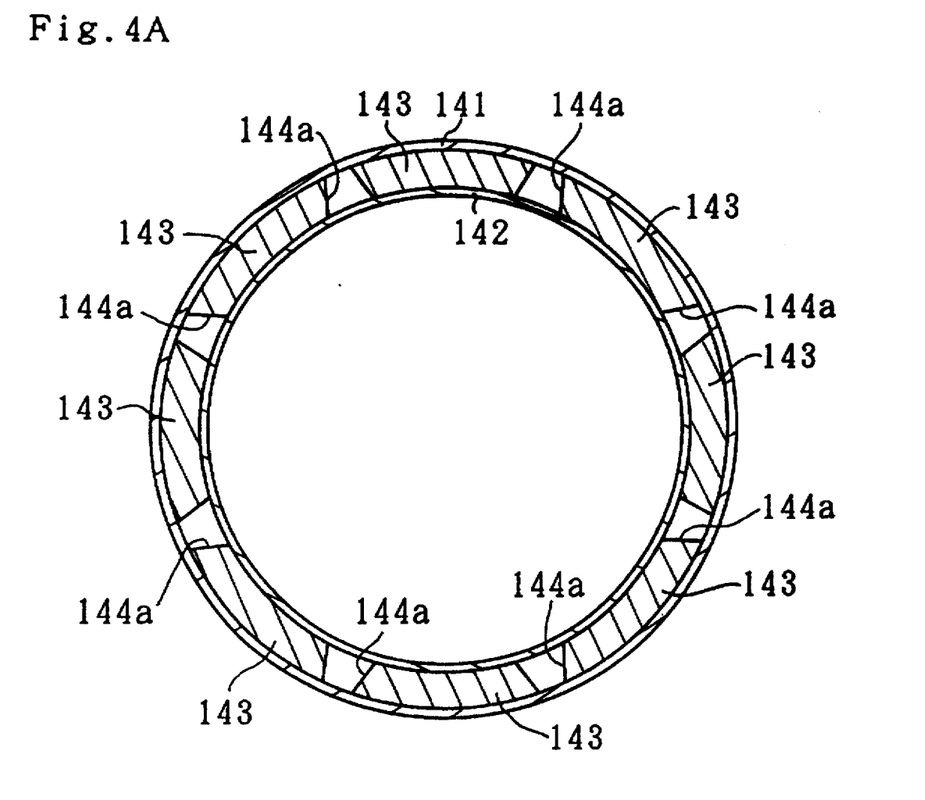
Figure 4B:
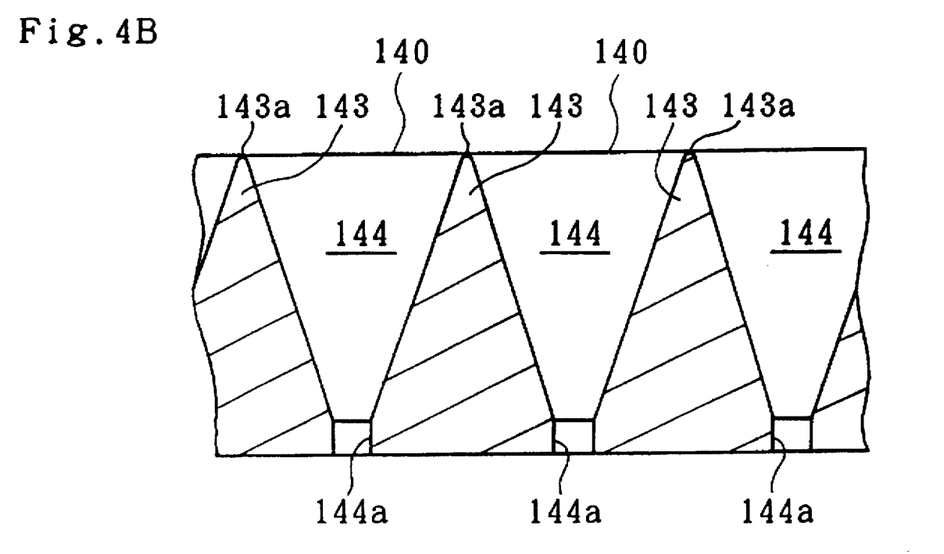

The wall thickness, in the circumferential direction, of each partition 143 constituting each powder chamber 144 increases gradually from the upper edge 143a toward the lower end, and is constant in the vicinity of the lower end, as illustrated in FIGS. 2, 4A and 4B. The inner face of the above-described outer peripheral wall 141 extends along the vertical direction. The inner face of the above-described inner peripheral wall 142 extends radially outwardly as the lower end is approached, and extends along the vertical direction in the vicinity of the lower end. The lower end of each powder chamber 144 constitutes an opening 144a.

Therefore, the inner face of each powder chamber 144 constitutes a tapered face continuous to the lower end opening 144a. The lower end opening 144a of each powder chamber 144 leads to 8 exits 146 formed through the support frame 107 and the bottom wall 110. Below each exit 146, the powder containers 3 are arranged.

Above each powder inlet 140, a first ring-shaped guide 150 is attached to the inner circumference of the housing 108, and a second ring-shaped guide 151 is attached to the outer circumference of the support column 126. The inner circumferential face of the first guide 150 is an inclined face extending radially inwardly as the lower end is approached, while the outer circumferential face of the second guide 151 is an inclined face extending radially outwardly as the lower end is approached.

To supply the powder 4 to the powder containers 3 by the above-described powder distribution apparatus 101, the weight of each portion of the powder 4 to be supplied to each powder container 3 is set in the first place. Next, the powder 4 is charged from the chute 10 to the hopper 112, in which the powder 4 whose weight is obtained by multiplying the preset weight by an integer of 8 is weighed out by using the load cell 12. Since the load cell 12 measures the sum of the weights of the powder 4 and hopper 112 rather than the weight of the powder 4 alone, the weight of the powder 4 must be obtained by subtracting the previously measured weight of the hopper 112 from the total weight. Next, the valve 115 is raised to open the lower opening of the hopper 112 to supply the powder 4 to the central portion of the powder receiving face 120a of the rotary element 120. The rotary element 120 has been rotated before the powder supply to the powder receiving face 120a. Therefore, as shown by the arrow in FIG. 1, the powder 4 is radially scattered from the peripheral portion of the powder receiving face 120a and dispersed almost uniformly with respect to the circumferential direction, by the centrifugal force produced by rotation of the rotary element 120. Most of the scattered powder 4 falls into the powder chambers 144 via the powder inlets 140 under guidance by the inner face of the peripheral wall 109 of the housing 108 and by the inner peripheral face of the first guide 150. The rest of the scattered powder 4 falls into the powder chambers 144 via the powder inlets 140 directly and under guidance by the outer peripheral face of the second guide 151. Each portion of the powder 4 introduced into each powder chamber 144 is supplied to each powder container 3 via the lower opening 144a and the exit 146. Each powder container 3 charged with the each distributed portion of the powder 4 is removed from the turntable 102, and a new empty powder container 3 is mounted on the turntable 102. On this occasion, by rotating the turntable 102, each powder container 3 can be removed and mounted without movement of the operator, ensuring good operation efficiency. The powder containers 3 may be automatically exchanged.

According to the above-described configuration, by radially scattering the powder 4 by centrifugal force, the powder 4 can be dispersed almost uniformly with respect to the circumferential direction. The dispersed powder 4 is divided into 8 almost equal portions, because it is introduced into 8 powder chambers 144 via 8 powder inlets 140 whose circumferential dimensions are mutually equal on any circle centering on the rotation axis of the rotary element 120. Because the weight of the powder 4 is obtained by multiplying the preset weight by an integer of 8, the weight of each distributed portion of the powder 4 is almost equal to the preset weight. Even if the bulk density of the powder 4 changes during distribution, the weight of each portion of the powder 4 introduced into each powder chamber 144 does not change. Therefore, the powder 4 can be distributed to each powder container 3 so that each weight of each distributed portion of the powder 4 corresponds to the preset weight without large error, without influence of change of the bulk density of the powder 4, and without painstaking operation or complex control system. In addition, the time taken to weigh the powder 4 can be reduced to one-eighth of the time taken to weigh the powder supplied to each powder container 3 one by one. Moreover, because the powder 4 does not undergo significant heat and compressive force, it does not melt, aggregate and crush. Because the rotary element 120 which exerts the centrifugal force on the powder 4 rotates around the rotation axis along the vertical direction, the powder is prevented from being unevenly scattered by the influence of gravity. Also, because the position of the peripheral portion of the powder receiving face 120a is higher than that of the central portion thereof, the influence of gravity on the powder 4 centrifugally scattered from the peripheral portion of the powder receiving face 120a can be reduced. Moreover, by dividing the peripheral portion of the powder receiving face 120a with a plurality of radially arranged partitions 123, distribution uniformity of the powder 4 with respect to the circumferential direction can be improved before the powder 4 is scattered from the peripheral portion. Therefore, distribution uniformity of the centrifugally radially scattered powder 4 can be improved with respect to the circumferential direction, so that the difference between the actual weight of each distributed portion of the powder 4 and the desired weight is reduced. When the powder 4 has an angle of repose of not more than 45 degrees and the mean diameter of the particles constituting the powder 4 is not more than about 20μ, such as for electrophotographic toner, the powder 4 can be smoothly scattered by the centrifugal force because of good fluidity of the powder 4, so that distribution uniformity of the centrifugally radially scattered powder can be improved with respect to the circumferential direction.

For improving the distribution uniformity of the powder 4 scattered by the centrifugal force produced by rotation of the rotary element 120 with respect to the circumferential direction, it is preferable that the rotation rate of the rotary element 120 is as high as possible.

Table 1 below shows the relation between the rotation rate of the rotary element 120 and the weight (gram) of each portion of the powder 4 introduced into each powder chamber 144, obtained from an experiment in which a total of 320 g of the powder 4 was introduced into 8 powder chambers 144 (chamber Nos. 1 through 8) according to the configuration of the above-described embodiment.

TABLE 1

| Rotation Rate | Weight of powder (g) | | | | | | | |
|---|---|---|---|---|---|---|---|---|
| | No. 1 | No. 2 | No. 3 | No. 4 | No. 5 | No. 6 | No. 7 | No. 8 |
| 0.471 m/sec (60 rpm) | 32 | 33 | 35 | 40 | 49 | 50 | 43 | 38 |
| 0.942 m/sec (120 rpm) | 36 | 50 | 36 | 38 | 37 | 46 | 38 | 39 |
| 3.927 m/sec (500 rpm) | 42 | 37 | 38 | 41 | 42 | 41 | 41 | 38 |
| 7.854 m/sec (1000 rpm) | 41 | 40 | 41 | 40 | 39 | 39 | 41 | 39 |

In Table 1, figures for rotation rate are shown by a combination of the peripheral speed (meter/sec) of the outer periphery of the rotary element 120 and the number of rotations per minute (rpm) of the rotary element 120. The powder 4 used was electrophotographic toner. The rotary element 120 used had an outer diameter of 150 mm, with a height difference of 15 mm between the center and periphery thereof; the powder receiving face 120a was finished by polishing. From Table 1, it is evident that the powder 4 can be distributed almost uniformly, provided that the circumferential speed of the outer periphery of the rotary element 120 exceeds 3.927 m/sec.

Figure 5A:
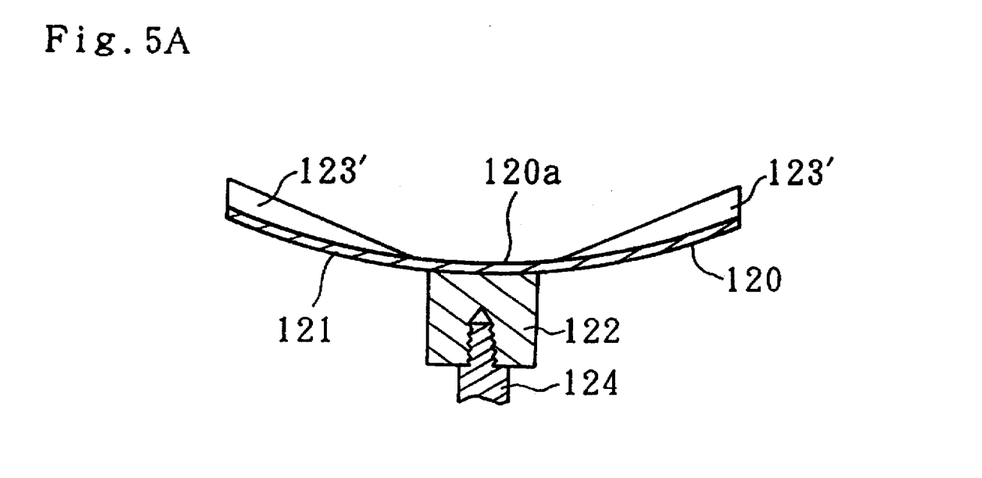
Figure 5B:
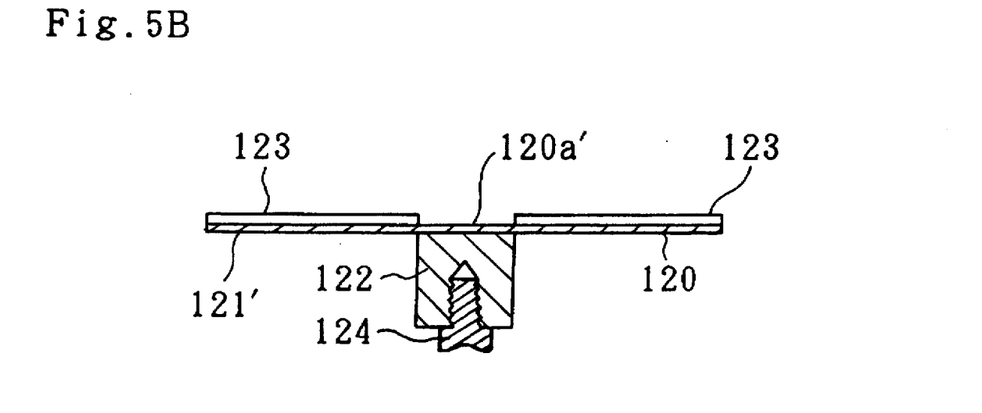
Figure 5C:
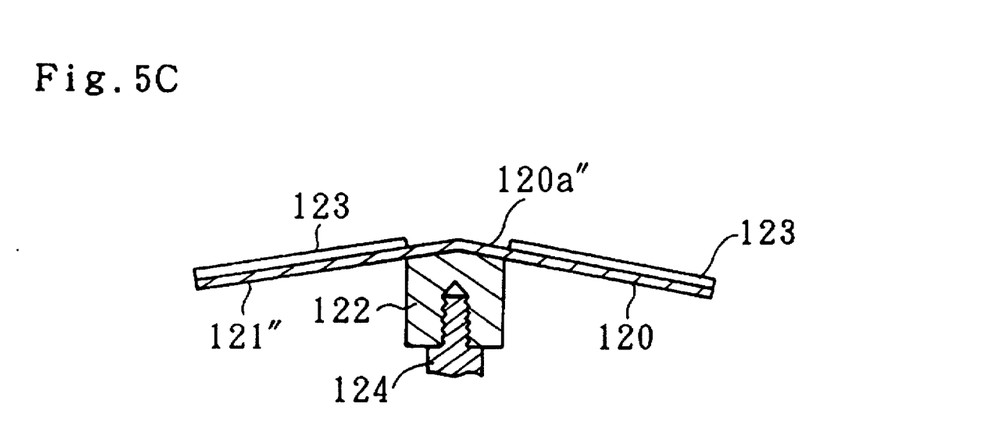

FIGS. 5A, 5B and 5C show first, second and third modifications of the rotary element 120, respectively. In contrast to the above embodiment, in which the height of each partition 123 of the rotary element 120 is uniform, the height of each partition 123' of the rotary element 120 of the first modification shown in FIG. 5A increases as the periphery of the powder receiving face 120a is approached. Also, the powder receiving face 120a of the body 121 of the rotary element 120 of the above embodiment is a parabolic face such that the position of the peripheral portion thereof is higher than that of the central portion thereof, while the powder receiving face 120a' of the body 121' of the rotary element 120 of the second modification shown in FIG. 5B is a flat face such that the position of the peripheral portion thereof and that of the central portion thereof are mutually equal. The powder receiving face 120a" of the body 121" of the rotary element 120 of the third modification shown in FIG. 5C is a conical face such that the position of the peripheral portion thereof is 15 mm lower than that of the central portion thereof.

Even in the case of the rotary element 120 of the second or third modification, the powder 4 can be scattered almost uniformly with respect to the circumferential direction to almost uniformly distribute the powder 4 by increasing the rotation rate thereof, as shown in Tables 2 and 3 below.

TABLE 2

| Rotation Rate | Weight of powder (g) | | | | | | | |
|---|---|---|---|---|---|---|---|---|
| | No. 1 | No. 2 | No. 3 | No. 4 | No. 5 | No. 6 | No. 7 | No. 8 |
| 7.854 m/sec (1000 rpm) | 40 | 44 | 42 | 37 | 35 | 44 | 40 | 38 |
| 15.708 m/sec (2000 rpm) | 41 | 40 | 42 | 41 | 37 | 38 | 40 | 41 |

TABLE 3

| Rotation Rate | Weight of powder (g) | | | | | | | |
|---|---|---|---|---|---|---|---|---|
| | No. 1 | No. 2 | No. 3 | No. 4 | No. 5 | No. 6 | No. 7 | No. 8 |
| 7.854 m/sec (1000 rpm) | 38 | 37 | 42 | 41 | 41 | 43 | 43 | 35 |
| 15.708 m/sec (2000 rpm) | 38 | 38 | 39 | 41 | 43 | 40 | 41 | 40 |

Tables 2 and 3 show the relation between the rotation rate of the rotary element 120 and the weight (g) of each portion of the powder 4 introduced into each powder chamber 144, obtained from experiments in which a total of 320 g of the powder 4 was introduced into 8 powder chambers 144 (chamber Nos. 1 through 8). The experiment whose results are shown in Table 2 was conducted under the same conditions as those shown in Table 1, except that the rotary element 120 of the second modification shown in FIG. 5B was used. The experiment whose results are shown in Table 3 was conducted under the same conditions as those shown in Table 1, except that the rotary element 120 of the third modification shown in FIG. 5C was used. From Tables 2 and 3, it is evident that even when the position of the peripheral portion of the powder receiving face of the rotary element 120 is not higher than that of the central portion thereof, the powder 4 can be almost uniformly distributed, provided that the circumferential speed of the outer periphery of the rotary element 120 exceeds 15.708 m/sec.

The present invention is not limited to the above-described embodiment and modifications. For example, the weight of each distributed portion of powder is not subject to limitation. As the weight of each distributed portion of powder decreases, the significance of applying the present invention increases. For example, in cases where electrophotographic toner is supplied to a number of containers on the basis of conventional weight measurement, efficiency is considerably low when the amount of each portions of the toner supplied to each powder container is as small as not more than 200 g, e.g., 30 g or 40 g. When we write the powder weight before distribution as W gram and the number of divisions as n, the present invention is effected when the W and n values bear the relation $W/n \leq 200$. Also, the number of powder divisions is not subject to limitation, as long as it is an integer of 2 or more. The shape of the powder receiving face is not subject to limitation; it may be regularly polygonal, rectangular, or the like, as a plan view. The shape of the housing is not subject to limitation; it may be hollow and conical, prismatic, pyramidal, or the like. Also, in the above embodiment, the distributed powder is supplied from each powder chamber to each powder container; however, the inside of the powder container may also serve as a powder chamber. In this case, the powder containers may be attachable to and detachable from the housing. Also, the means for weighing the powder is not limited to load cells, as long as it is capable of weighing. The present invention is also applicable to the case where the powder is not distributed equally but distributed at any ratio.

What is claimed is:

1. A powder distribution method comprising the steps of:

radially scattering previously weighed powder, whose weight is obtained by multiplying a preset weight by an integer N greater than or equal to 2, by centrifugal force; and introducing the scattered powder into a plurality of powder chambers via a plurality of powder inlets arranged along a circumferential direction;

wherein the centrifugal force is exerted by a rotary element rotating around a rotation axis along a vertical direction;

the plurality of powder inlets are arranged around the rotation axis of the rotary element;

dimensions of the plurality of powder inlets along the circumferential direction are mutually equalized on a circle centered on the rotation axis of the rotary element;

a total number of the plurality of power inlets is equal to the integer N;

an angle of repose of the powder is not more than 45 degrees;

a first ring-shaped guide is attached to an inner circumference of a housing, including the plurality of powder inlets and the plurality of powder chambers, so as to be positioned above the plurality of powder inlets;

an inner circumferential face of the first ring-shaped guide is an inclined face whose lower end extends radially inwardly;

a second ring-shaped guide is attached to an outer circumference of a support column supporting the rotary element so as to be positioned above the plurality of powder inlets; and an outer circumferential face of the second ring-shaped guide is an inclined face whose lower ends extends radially outwardly.

2. An apparatus for distributing powder into a plurality of powder chambers comprising:

a housing;

means for radially scattering the powder in said housing by centrifugal force;

said means for radially scattering the powder including a rotary element rotatable around a rotation axis along a vertical direction in said housing;

said rotary element including a powder receiving face;

wherein a position of a peripheral portion of the powder receiving face being higher than that of a central portion thereof;

a plurality of powder inlets arranged along a circumferential direction for introducing the scattered powder into the plurality of powder chambers;

said plurality of powder inlets being arranged around the rotation axis of said rotary element;

wherein dimensions of said plurality of powder inlets along the circumferential direction are mutually equal on a circle centered on the rotation axis of said rotary element;

a first ring-shaped guide, attached to an inner circumference of said housing so as to be positioned above said plurality of powder inlets, an inner circumferential face of said first ring-shaped guide being an inclined face whose lower end extends radially inwardly; and a second ring-shaped guide, attached to an outer circumference of a support column supporting said rotary element so as to be positioned above said plurality of powder inlets, an outer circumferential face of said second ring-shaped guide being an inclined face whose lower end extends radially outwardly;

wherein the powder supplied to said powder receiving face can be radially scattered from a peripheral portion of said powder receiving face by action of the centrifugal force produced by rotation of said rotary element.

* * * * *